(12) United States Patent
Vicars

(10) Patent No.: US 7,891,374 B2
(45) Date of Patent: Feb. 22, 2011

(54) SUCTION VALVE

(76) Inventor: Berton L. Vicars, P.O. Box 2497, Ruidoso, NM (US) 88355

( * ) Notice: Subject to any disclaimer, the term of this patent is extended or adjusted under 35 U.S.C. 154(b) by 154 days.

(21) Appl. No.: 12/453,461

(22) Filed: May 12, 2009

(65) Prior Publication Data

US 2010/0288958 A1 Nov. 18, 2010

(51) Int. Cl.
*F16K 15/06* (2006.01)

(52) U.S. Cl. .............. 137/454.4; 137/516.29; 137/541; 137/542; 251/337

(58) Field of Classification Search ........... 137/454.4, 137/454.6, 516.29, 541, 542, 543; 251/337
See application file for complete search history.

(56) References Cited

U.S. PATENT DOCUMENTS

| 144,844 A | 11/1873 | Gould et al. |
| 187,022 A * | 2/1877 | Loughridge ............. 137/541 |
| 255,400 A * | 3/1882 | Waring ................ 137/541 |
| 313,893 A * | 3/1885 | Smith ................ 137/454.4 |
| 620,936 A * | 3/1899 | Kunzer ................ 137/541 |
| 754,569 A * | 3/1904 | Jones ................. 137/542 |
| 1,029,025 A * | 6/1912 | Murray ............... 137/454.4 |
| 2,078,347 A | 4/1937 | Shepherd et al. |
| 2,679,262 A | 5/1954 | Barnett et al. |
| 3,727,636 A * | 4/1973 | Simmons ............... 137/541 |
| 3,772,624 A * | 11/1973 | Keogh ................ 137/541 |
| 4,232,704 A | 11/1980 | Becker et al. |
| 4,766,927 A | 8/1988 | Conatser |
| 4,974,628 A * | 12/1990 | Tepermeister et al. .... 137/454.4 |
| 5,171,136 A | 12/1992 | Pacht |
| 6,470,911 B2 | 10/2002 | Miura et al. |
| 6,695,007 B2 * | 2/2004 | Vicars ................ 137/541 |
| 7,028,994 B2 | 4/2006 | Sherikar |
| 7,172,175 B2 * | 2/2007 | Vicars ................ 137/542 |
| 7,290,559 B2 * | 11/2007 | Nieslony et al. ......... 137/454.4 |
| 2004/0234404 A1 * | 11/2004 | Vicars ................ 417/571 |

* cited by examiner

*Primary Examiner*—John Rivell
(74) *Attorney, Agent, or Firm*—Stephen R. Greiner

(57) ABSTRACT

A suction valve seat and guide assembly has an outer ring and a peripheral flange projecting outwardly from the bottom of the outer ring, and an inner surface with a top part sloping downwardly and inwardly toward the center of the outer ring. The outer ring has an outer surface that slopes upwardly and inwardly from the flange. The guide has an inner ring positioned within the outer ring and a number of spaced-apart fins connecting the inner ring to the outer ring. A retainer has an internal passageway, an externally threaded, upper segment within the top of which is fitted the peripheral flange of the seat; a middle segment that is affixed to the bottom of the upper segment and has a polygonal cross section for easy gripping by a wrench; and, a bottom segment that is affixed to the bottom of the middle segment.

8 Claims, 2 Drawing Sheets

SUCTION VALVE

FIELD OF THE INVENTION

The present invention relates generally to fluid handling apparatus and, more particularly, to direct response valves of reciprocating type.

BACKGROUND OF THE INVENTION

Hydraulic fracturing can increase the rate of production of oil and gas from low-permeability reservoirs. As is well known, hydraulic fracturing increases the permeability of reservoir rocks by opening channels through which oil and gas can travel to recovery wells. During hydraulic fracturing, a fluid is pumped under high pressure into a subterranean reservoir where it splits the reservoir rock open. A proppant, like sand, is often added to the pumped fluid and is carried in suspension into the newly formed fractures. When pumping ceases, the fractures partially close on the proppant, leaving open channels for oil and gas to flow to recovery wells.

High-pressure pumps make possible hydraulic fracturing procedures or "frac jobs." These pumps have "fluid ends" within which a number of reciprocating plungers pressurize fracture fluids. Suction and discharge valves control fluid flow to, and from, the plungers. A valve that has too many internal projections can capture or "knock out" enough proppant to block the flow of fluid through a pump, requiring that time and effort be invested to clear the blockage—a costly undertaking. Also, these projections can create substantial pressure losses that require more energy to be expended than is necessary to perform hydraulic fracturing work.

SUMMARY OF THE INVENTION

In light of the problems associated with the suction valves commonly used within high-pressure pumps, it is a principal object of the invention to provide a suction valve that minimizes the likelihood of proppant being knocked out of suspension. My suction valve, thus, offers few impediments to flow of fluids through it. As a result, fracture fluids with higher than normal concentrations of suspended proppants can be pumped with substantial cost savings accruing to the user.

It is another object of the invention to provide a suction valve of the type described that can be seated in a shallow, suction passage in a fluid end. A suction passage of shallow depth requires that less metal be removed from the body of a fluid end at the time of manufacture than does one of greater depth. It is unlikely, then, that a fluid end configured to receive my new suction valve will fail from the development of excessive, internal stresses and cracks.

It is a further object of the invention to provide a suction valve of the type described that is easily and quickly installed and serviced through a suction passage in a fluid end.

It is an object of the invention to provide improved features, and arrangements thereof, in a suction valve for the purposes described that is lightweight in construction, inexpensive to manufacture, and dependable in use.

Briefly, my suction valve achieves the intended objects by featuring a valve seat and guide assembly with a seat portion and a guide portion. The seat portion has an outer ring and a peripheral flange projecting outwardly from the bottom of the outer ring. The guide portion has an inner ring positioned within the outer ring and a number of spaced-apart fins connecting the inner ring to the outer ring. A piston has a head that engages the top part of the outer ring and a stem that extends downwardly from the head and through the inner ring. The stem also has a peripheral groove therein. A valve keeper, having a recess in the bottom thereof, is fitted upon the stem. A split ring is positioned within the peripheral groove in the stem and within the recess in the valve keeper. A compressed spring is positioned between, and exerts opposing forces upon, the inner ring and the valve keeper so as to normally retain the head in engagement with the top part of the valve seat. A valve retainer, having an internal passageway for delivering fluids to the valve seat and guide assembly, is threaded into a fluid end to hold the balance of the suction valve in place and provide means for attaching the valve to a suction manifold.

The foregoing and other objects, features and advantages of my suction valve will become readily apparent upon further review of the following text and accompanying drawings.

BRIEF DESCRIPTION OF THE DRAWINGS

My suction valve may be more readily described with reference to the accompanying drawings, in which.

Similar reference characters denote corresponding features consistently throughout the accompanying drawings.

DETAILED DESCRIPTION OF THE PREFERRED SUCTION VALVE

Figure 1:
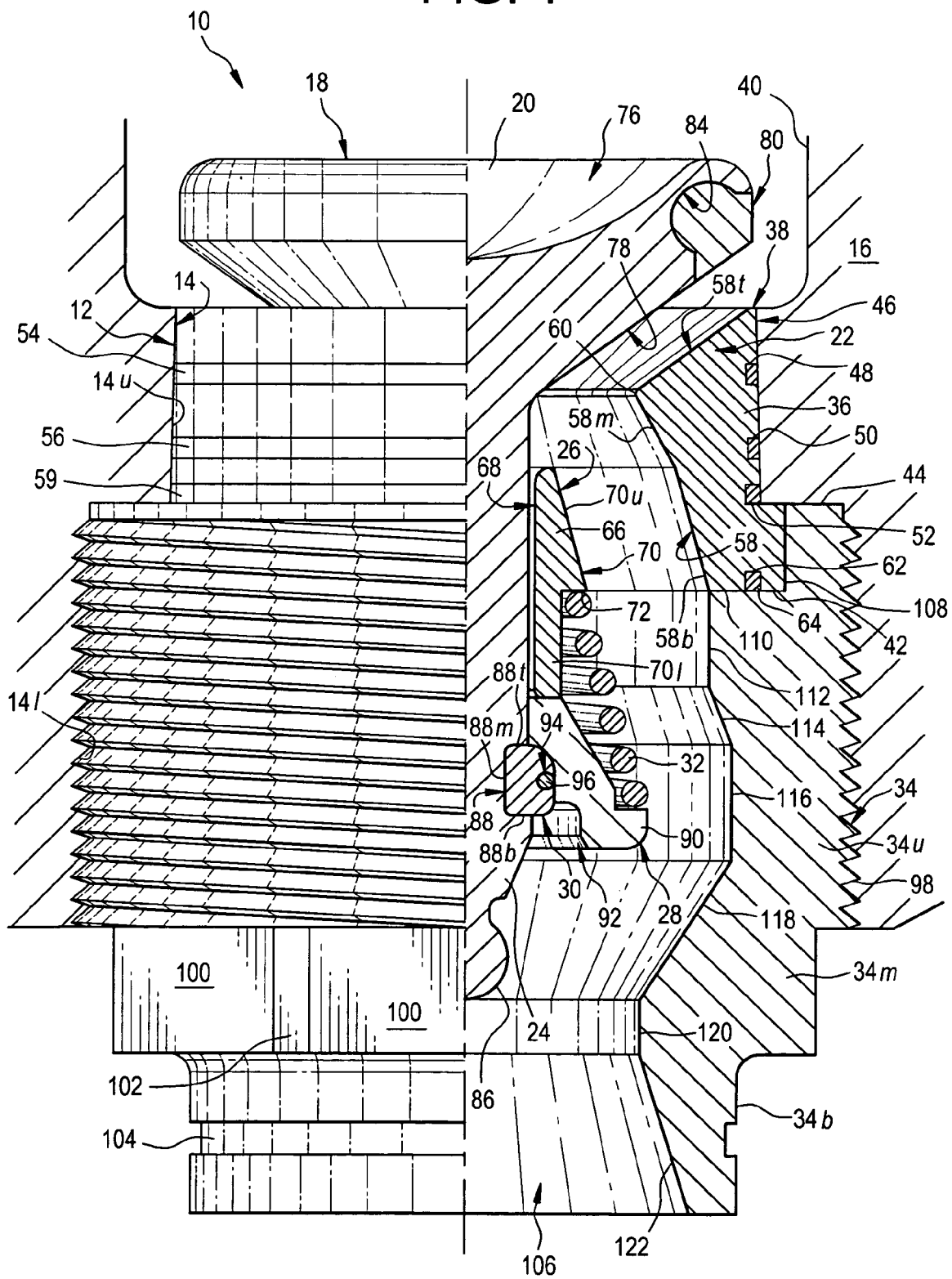
FIG. 1 is a side elevational view of my suction valve with portions broken away to reveal details thereof.
Figure 2:
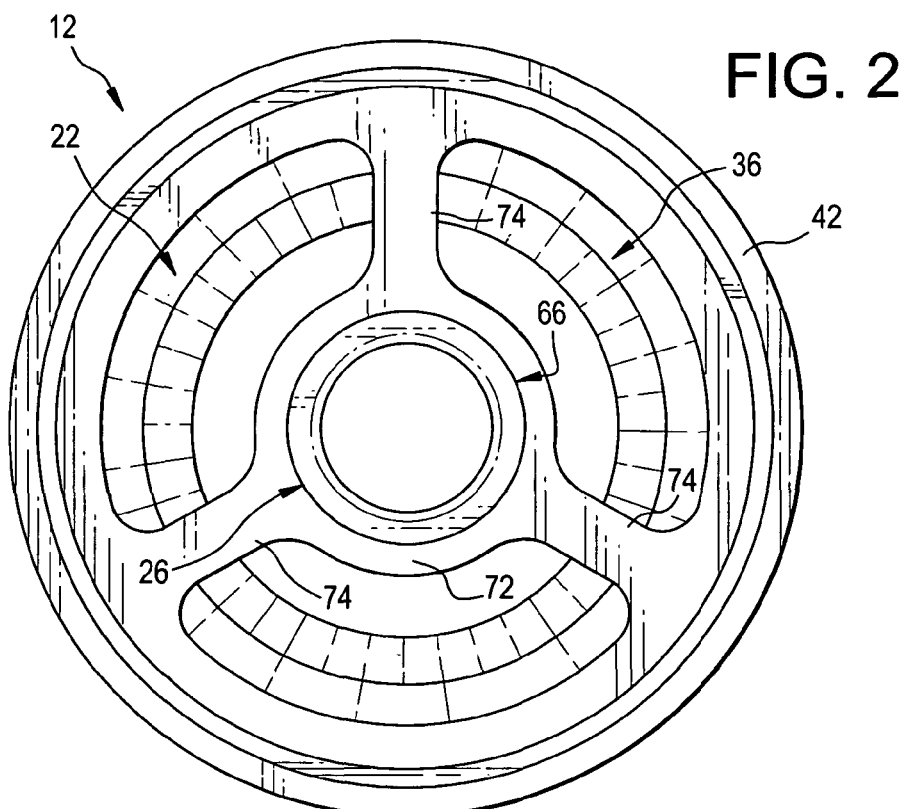
FIG. 2 is a bottom view of the valve seat and guide assembly of the suction valve of FIG. 1.
Figure 3:
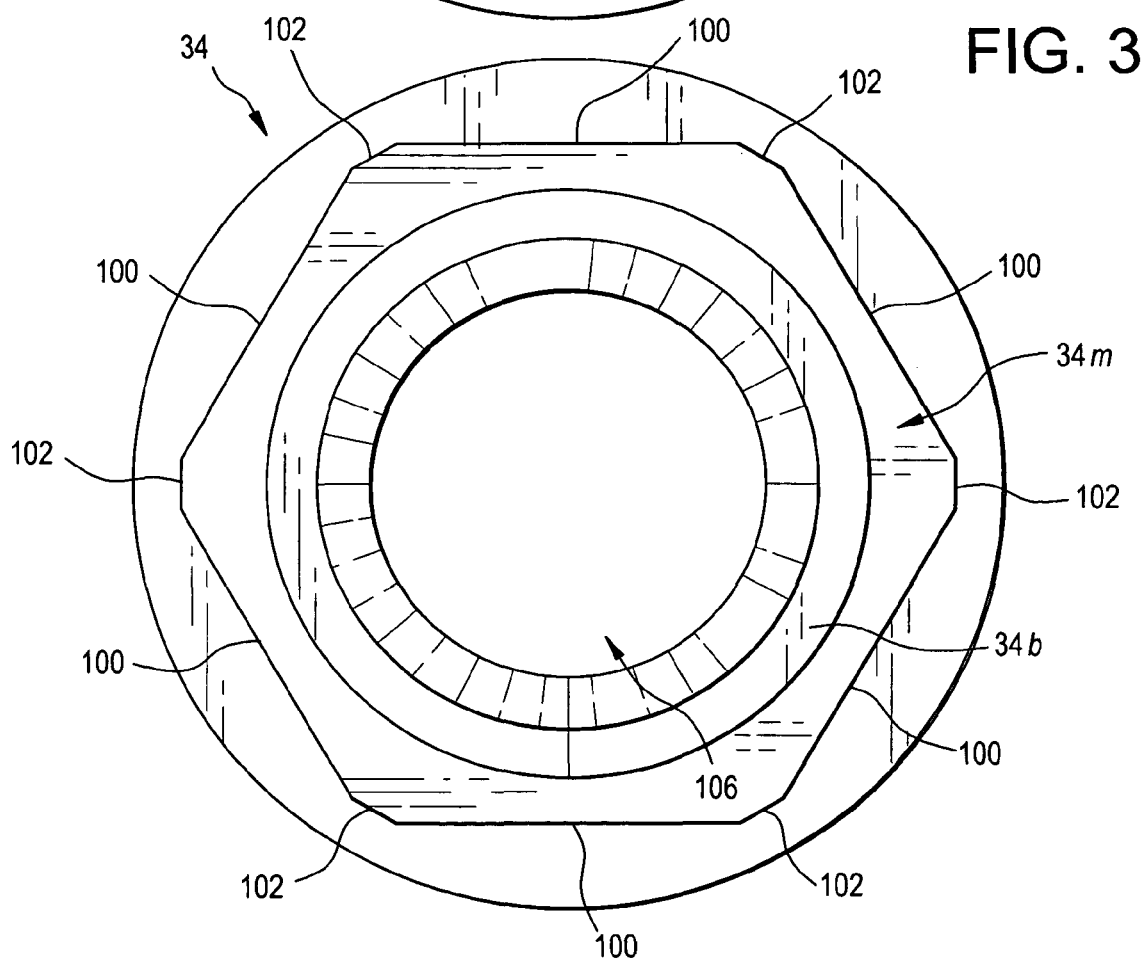
FIG. 3 is a bottom view of the valve retainer of my suction valve.

Referring now to the FIGS., a suction valve in accordance with the present invention is shown at 10. Valve 10 includes a valve seat and guide assembly 12 for positioning in a suction passage 14 of a fluid end 16 and a piston 18 that moves within assembly 12 to control the flow of fluid through passage 14. Piston 18 has a head 20 for engaging the seat portion 22 of assembly 12 and a stem 24 extending downwardly from head 20 through the guide portion 26 of assembly 12. A valve keeper 28 is fitted upon the bottom of stem 24 and is retained there by a split ring 30. A compressed spring 32 is positioned between guide portion 26 and keeper 28 for normally retaining head 20 in engagement with seat portion 22 to prevent fluid flow through passage 14. A valve retainer 34 is screwed into suction passage 14 to retain the balance of valve 10 within fluid end 16 and provide for the attachment of valve 10 to a suction manifold (not shown).

Seat portion 22 comprises an outer ring 36 that fits snugly within the narrowed, unthreaded, upper part 14u of passage 14. The height of outer ring 36 is sufficient to place the top of the top surface 38 thereof flush with the sides of a pumping chamber 40 in fluid end 16. Seat portion 22 also includes a peripheral flange 42 that is integrally formed with outer ring 36 and projects outwardly from the bottom of outer ring 36 so as to rest upon a shoulder or seat deck 44 where the wide, internally threaded, lower part 14l of passage 14 meets upper part 14u.

Outer ring 36 has an outer surface 46 that slopes upwardly an inwardly at a shallow angle corresponding in slope with upper part 14u of passage 14. A number of peripheral channels 48, 50, and 52 are provided around outer surface 46 at spaced-apart intervals. Within channels 48, 50 and 52 are positioned o-ring seals 54, 56 and 59, respectively. Tapering outer surface 46, as described, prolongs the life of seals 54 and 56 as well as reduces the likelihood of fatigue cracks forming in fluid end 16, a problem encountered in "old style" fluid ends where valve seats pressed outwardly on the sides of pumping chambers during pressurizing plunger strokes.

Outer ring 36 has an inner surface 58 that is shaped to reduce turbulence in fluid moving through valve 10. Inner surface 58 has a top part 58t that is beveled such that it slopes downwardly and inwardly toward the center of seat portion 22 at an angle of about 36°, an angle that can be increased as a matter of design choice to optimize the action of valve 10. Inner surface 58 also has a bottom part 58b that slopes upwardly and inwardly at a steeper incline, say 74°. Connecting bottom part 58b and top part 58t together, inner surface 58 has a medial part 58m that slopes upwardly and inwardly at an inclination that is about 10° less than that of bottom part 58b. Thus, inner surface 58 is "stepped" to funnel fluids through a narrowed neck 60 in seat portion 22 at the junction of the top part 58t and medial part 58m with minimal pressure losses.

Peripheral flange 42 extends outwardly from the bottom of outer ring 36 at right angles. The top of flange 42 snugly engages seat deck 44 thereby ensuring a strong platform for assembly 12. To ensure against fluid leaks around seat deck 44, the bottom of flange 42 is provided with a peripheral groove 62 that receives an o-ring seal 64 for engaging valve retainer 34.

Guide portion 26 includes an inner ring 66 that slidably receives stem 24 of piston 18. Inner ring 66 has an interior wall 68 for engaging stem 24 and an opposed exterior wall 70. Exterior wall 70 has an upper part 70u and a lower part 70l of smaller diameter and substantially equal height. A shoulder 72 is provided at the junction of the upper and lower parts 70u and 70l that serves as an abutment for the top of spring 32. Upper part 70u is positioned within seat portion 22 adjacent flange 42 and tapers upwardly and inwardly so as to reduce turbulence in a fluid flowing through guide portion 26. Lower part 70l projects outwardly from the bottom of seat portion 22.

Inner ring 66 and outer ring 36 are connected together by three, vertically oriented fins 74. Fins 74 radiate outwardly from upper part 70u of exterior wall 70 of inner ring 66 at 120° intervals to join bottom part 58b of outer ring 36. Fins 74 are taller than they are wide to best withstand axial loads. Also, fins 74 are horizontally oriented for minimum weight and maximum strength. Rings 66 and 36 and fins 74 present minimal impediments to fluid flow through assembly 12 and permit valve 10 to handle fluids with higher proppant concentrations than normal.

The top of head 20 is provided with a shallow recess 76 such that it resembles a bowl. Recess 76 reduces the mass of piston 18 thereby permitting piston 18 to reciprocate at greater speeds and minimize the leakage of fluids through valve 10. Furthermore, recess 76 serves to admit the free end of a reciprocating plunger (not shown) within fluid end 16 so as to allow the length and volume of pumping chamber 40 to be minimized.

Head 20 has a beveled, peripheral edge 78 that is adapted to snugly engage top part 58t of seat portion 22. Extending around edge 78 is an insert 80, formed of a durable material, which serves as sealing element for valve 10. Insert 80 has a back edge 82 that is circular in cross section so as to "snap fit" into a correspondingly shaped recess 84 around head 20. Back edge 82 is easy to press into head 20 at the time of manufacture and has little tendency to loosen during use.

Stem 24 has a spherical knob 86 at its bottom end. As shown, the diameter of knob 86 is smaller than the diameter of stem 24 to easily fit through inner ring 66. Knob 86 is employed to grip piston 18 during valve servicing operations.

Above knob 86, stem 24 is provided with a peripheral groove 88. Groove 88 has a top surface 88t, a bottom surface 88b, and a medial surface 88m that connects top surface 88t and bottom surface 88b together. Top surface 88t slopes outwardly and downwardly at an angle of 5° so as to positively grip correspondingly shaped split ring 30 and keep split ring 30 from springing outwards during use of valve 10. Bottom surface 88b is horizontally oriented and medial surface 88m is vertically oriented to permit the easy installation of split ring 30.

Valve keeper 28 is fitted over the bottom of stem 24 and has a conical configuration. Keeper 28 has an exterior diameter that increases gradually from its top, where it has the same diameter as exterior wall 70l of inner ring 66, to its bottom. Extending outwardly from the bottom of keeper 28 is a peripheral rim 90 that serves as an abutment for the bottom of spring 32.

A recess 92 is provided in the bottom of keeper 28 for snugly receiving split ring 30 that is fitted into groove 88 in stem 24. To ensure that split ring 30 does not slide from recess 92, split ring 30 is provided with a peripheral groove 94 at its midpoint into which is fitted an o-ring 96. O-ring 96 serves as a safety feature to wedge valve keeper 28 and split ring 30 together even if spring 32 breaks thereby reducing the likelihood that piston 18 will come altogether loose during the use of valve 10.

Valve retainer 34 is segmented, hollow, and cylindrical. The upper segment 34u of retainer 34 is provided with external, helical threads 98 that screw tightly into correspondingly machined threads around lower part 14l of passage 14.

Valve retainer 34 has a middle segment 34m that is integrally formed at the bottom of upper segment 34u. As shown, middle segment 34m has a polygonal cross section with six, principal, external faces 100 separated by six, secondary, external faces 102 hexagonally arranged. Faces 100 can be gripped by a wrench for rotating valve retainer 34 to unscrew threads 98 from those of passage 14 during the installing and servicing of valve 10.

Valve retainer 34 has a bottom segment 34b that is integrally formed at the bottom of middle segment 34m. Bottom segment 34b is circular in cross section and has a peripheral slot 104 around the middle thereof. Slot 104 accommodates a VICTAULIC coupling (not shown) for the quick and easy connection of valve retainer 34 to a suction manifold that delivers fluid to valve 10.

Valve retainer 34 has a segmented passageway 106 that conveys fluid through segments 34u, 34m, and 34b into assembly 12. The uppermost fraction of passageway 106 extends downwardly from the top of upper segment 34u and acts as a recess for snugly receiving flange 42 of assembly 12. The uppermost fraction of passageway 106 is defined by a circular, side wall 108 that closely accommodates the periphery of flange 42 and a flat, top wall 110 that projects inwardly from side wall 108 to engage the bottom of flange 42. A middle fraction of passageway 106 provides an annular flow space around valve keeper 28 below the uppermost fraction. The middle fraction, thus, bulges around valve keeper 28 with a cascade of five walls 112-120. First wall 112 extends vertically downward from the inner edge of top wall 110. Second wall 114 slopes downwardly and outwardly from the bottom of first wall 112. Third wall 116 extends vertically downward from the bottom of second wall 114. Fourth wall 118 slopes downwardly and inwardly from the bottom of third wall 116. Fifth wall 120 extends vertically downward from the bottom of fourth wall 118. (Fifth wall 120, being small in diameter and near the fluid entry into valve 10, is a narrowed neck that limits the amount of fluid entering valve 10 and increases the velocity of that fluid. By properly sizing the diameter of wall 120, a user of valve 10 can establish a jetting action for fluids passing through valve 10 that drives any proppant that may collect in, or around, keeper 28 into the flow stream and from valve 10.) The lowermost fraction of passageway 106 is defined by a tapered, bottom wall 122 that slopes upwardly and inwardly from the bottom of bottom segment 34b and joins, at its top, the bottom of fifth wall 120.

The assembly, installation, and use of valve 10 are straightforward. To assemble valve 10, insert 80 is first positioned in recess 84 in piston 20. Then, stem 24 is extended through inner ring 66 of assembly 12. Next, spring 32, keeper 28, and split ring 30 (with o-ring 96 attached) are, in turn, positioned over stem 24. Now, by compressing spring 32 against shoulder 72 of inner ring 66 with keeper 28, split ring 30 is worked into peripheral groove 88. Afterward, the assembled portion of valve 10 is slid into the upper portion 14u of passage 14 in fluid end 16. At this point, valve keeper 28 is screwed into lower portion 14l of passage 14 by means of a wrench gripping external faces 100 of valve retainer 34. Finally, VICTAULIC clamps (not shown) are employed to connect valve 10 at slot 104 to a suction manifold associated with fluid end 16. Valve 10 is ready for use after a few minutes work.

After installation of valve 10 in fluid end 16, a plunger (not shown) is reciprocated above head 20. As the plunger moves forward to drive fluid from its cylinder, peripheral edge 78 of head 20 is snugly pressed under the influence of spring 32 against top surface 58t of seat portion 22 ensuring that no fluid leaks through passage 14. When the plunger travels back to its starting point, a partial vacuum is created that lifts piston 18 against the compressive force of spring 32 and draws fluid upwardly through passageway 106 and valve 10. The process of opening and closing valve 10 is entirely automatic and requires mere fractions of a second to accomplish. Since the valve 10 minimizes turbulent flow, proppant is not captured by valve 10 to block flow through assembly 12 or retainer 34 under normal conditions of use.

While suction valve 10 has been described with a high degree of particularity, it will be appreciated by those skilled in the art that modifications can be made to it. Therefore, it is to be understood that the present invention is not limited merely to valve 10, but encompasses any and all valve embodiments within the scope of the following claims.

I claim:

1. A suction valve, comprising:
    a valve seat and guide assembly including:
        a seat portion having an outer ring and a peripheral flange projecting outwardly from the bottom of said outer ring, said outer ring having an inner surface with a top part sloping downwardly and inwardly toward the center of said outer ring, and said outer ring having an outer surface sloping upwardly and inwardly from said peripheral flange; and,
        a guide portion having an inner ring being positioned within said outer ring and a plurality of spaced-apart fins connecting said inner ring to said outer ring;
    a piston having a head for engaging said top part of said seat portion and a stem extending downwardly from said head and through said inner ring of said guide portion, and said stem also having a peripheral groove therein;
    a valve keeper being fitted upon said stem such that said inner ring is disposed between said top part of said seat portion and said valve keeper, and said valve keeper having a recess in the bottom thereof;
    a split ring being positioned within said peripheral groove in said stem and within said recess in said valve keeper;
    a compressed spring being positioned between, and exerting opposing forces upon, said inner ring and said valve keeper so as to normally retain said head in engagement with said top part of said valve seat; and,
    a valve retainer having an internal passageway for delivering fluids to said valve seat and guide assembly, said valve retainer including:
        an externally threaded, upper segment within the top of which is fitted said peripheral flange of said seat portion;
        a middle segment being affixed to the bottom of said upper segment and having a polygonal cross section for easy gripping by a wrench; and,
        a bottom segment being affixed to the bottom of said middle segment and being adapted for attachment to the suction manifold of a pump.

2. The suction valve according to claim 1 wherein said inner surface of said outer ring has a bottom part, located beneath said top part, that slopes upwardly and inwardly toward the center of said outer ring, and said inner surface further has a medial part that slopes upwardly and inwardly toward the center of said outer ring at a shallower angle than said bottom part and connects said top part to said bottom part.

3. The suction valve according to claim 1 wherein said seat portion includes a plurality of spaced-apart, peripheral channels in said outer surface and further includes a plurality of o-ring seals, a respective one of which is positioned in each of said peripheral channels.

4. The suction valve according to claim 1 wherein said head of said piston has a peripheral recess and said suction valve further comprises an insert with a back edge that is circular in cross section snugly positioned within said peripheral recess for engaging said top part of said seat portion.

5. The suction valve according to claim 1 wherein said internal passageway of said valve retainer has a narrowed neck for increasing the velocity of fluids drawn past said valve keeper.

6. The suction valve according to claim 1 wherein said inner ring includes:
    an interior wall for engaging said stem of said piston;
    an exterior wall being opposite said interior wall; and,
    a radial flange extending outwardly from said exterior wall serving as an abutment for the top of said compressed spring.

7. The suction valve according to claim 1 comprising three of said fins radiating from said inner ring at 120° intervals.

8. The suction valve according to claim 1 wherein said split ring has a peripheral slot therein and said suction valve further includes an o-ring positioned in said peripheral slot.

* * * * *